Nov. 17, 1936.  C. W. STRATFORD ET AL  2,060,835
CENTRIFUGE
Filed Oct. 26, 1932  6 Sheets-Sheet 6
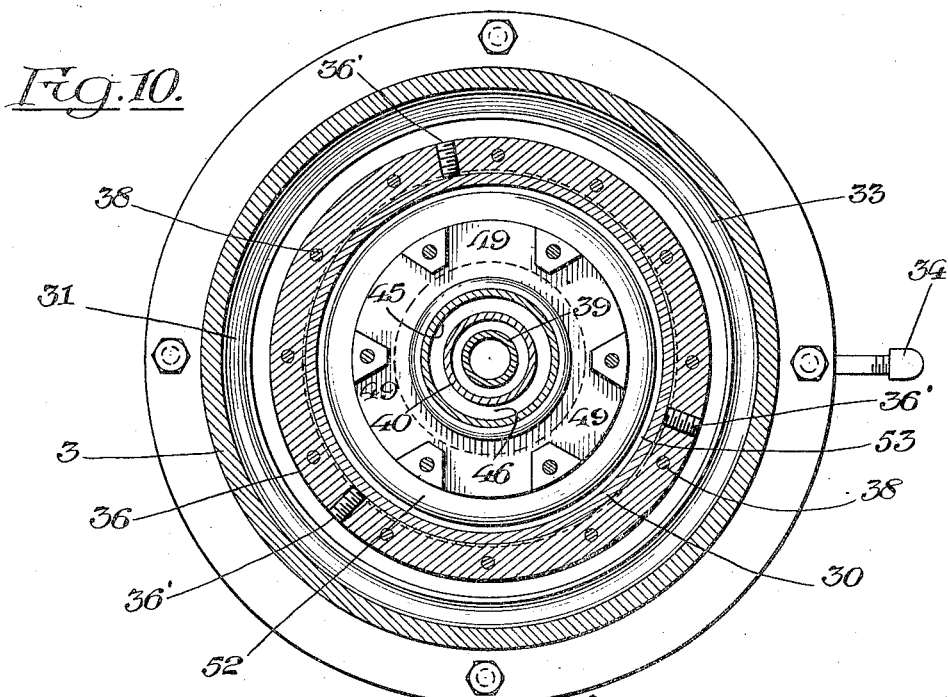
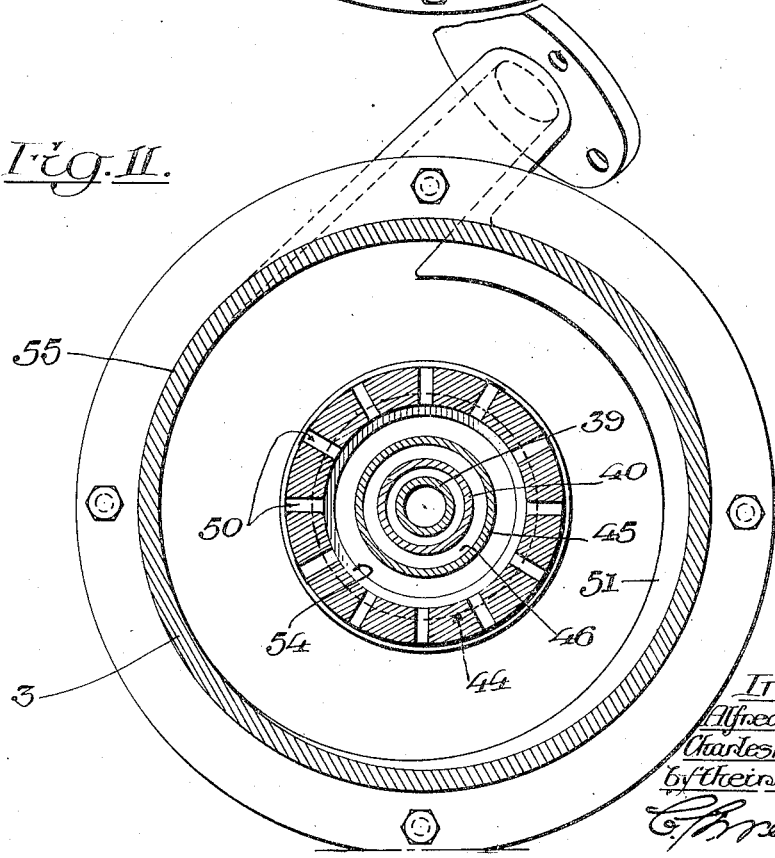

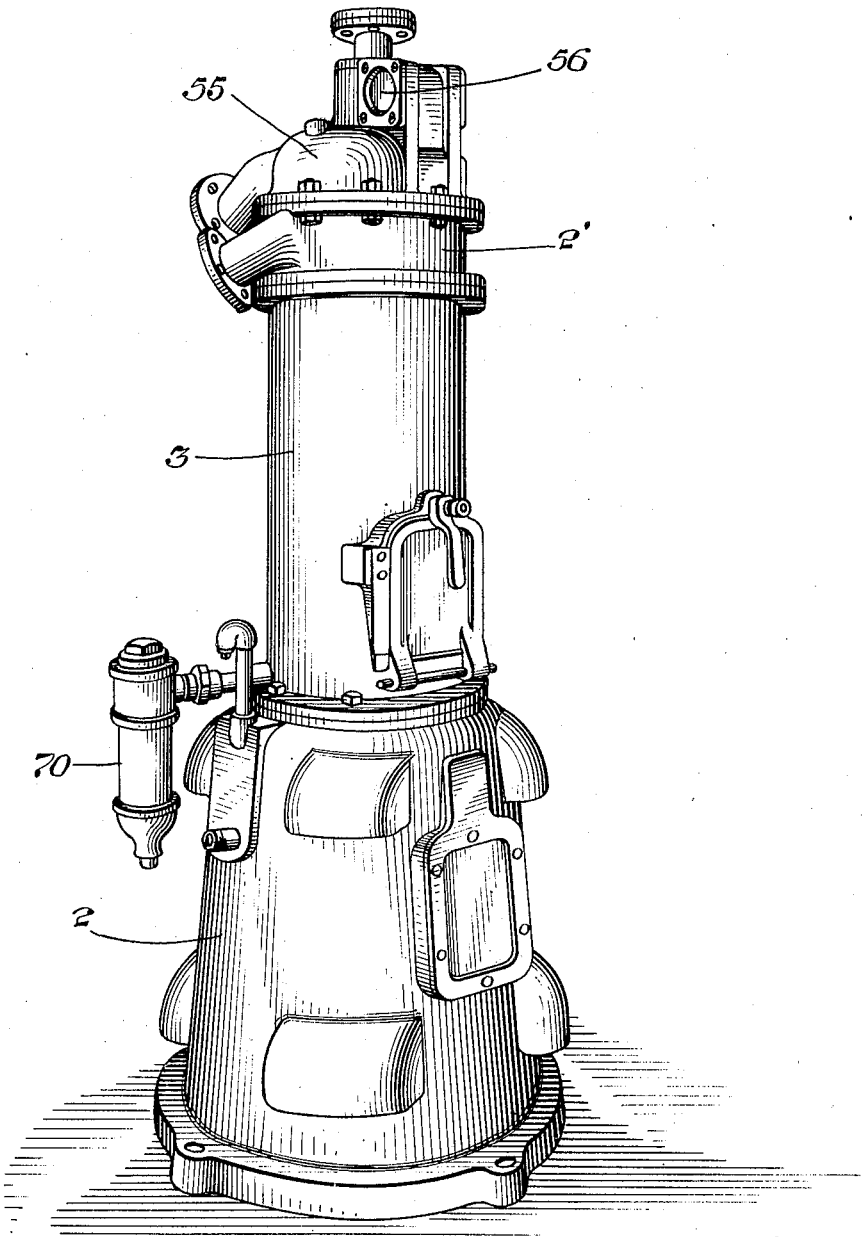

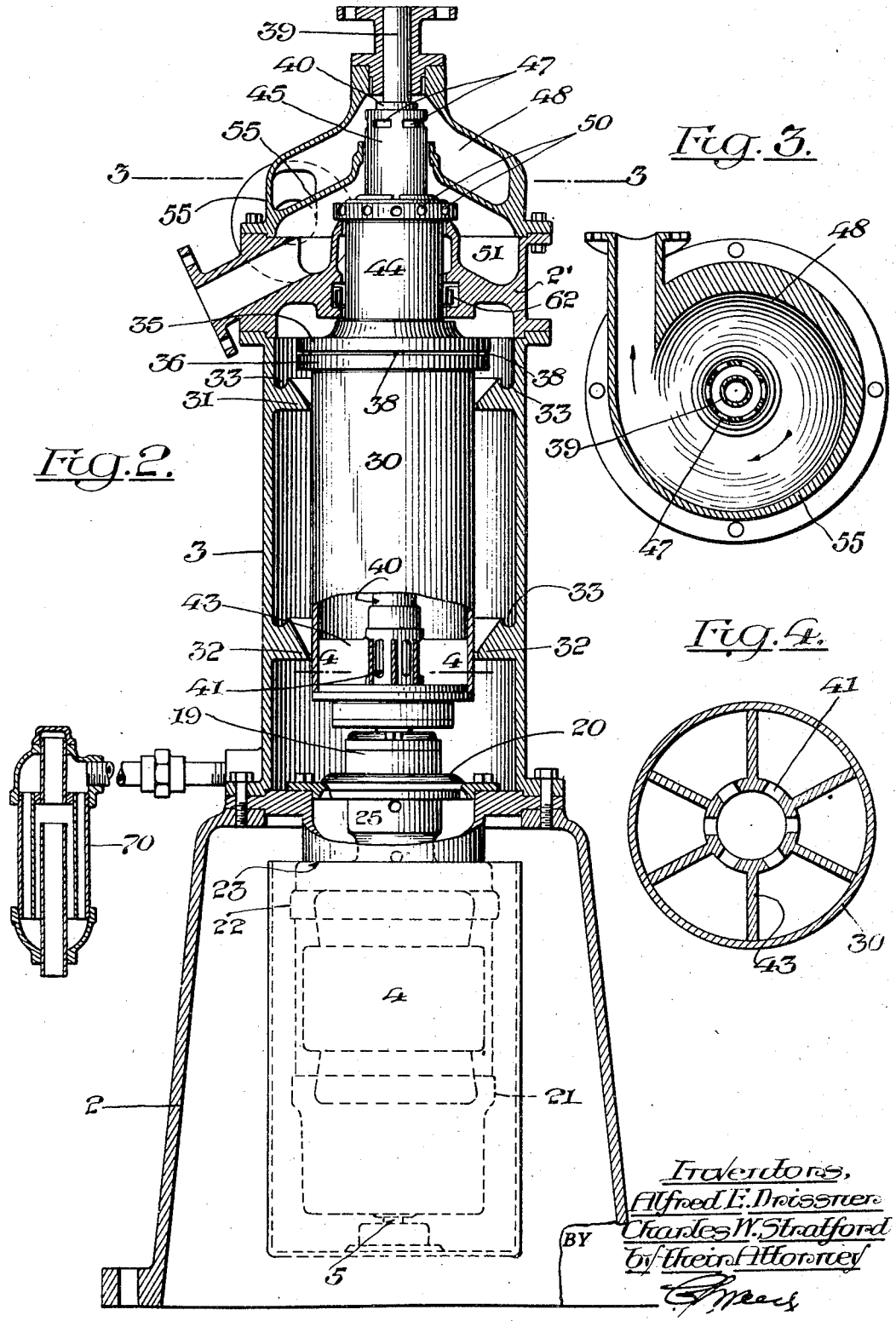

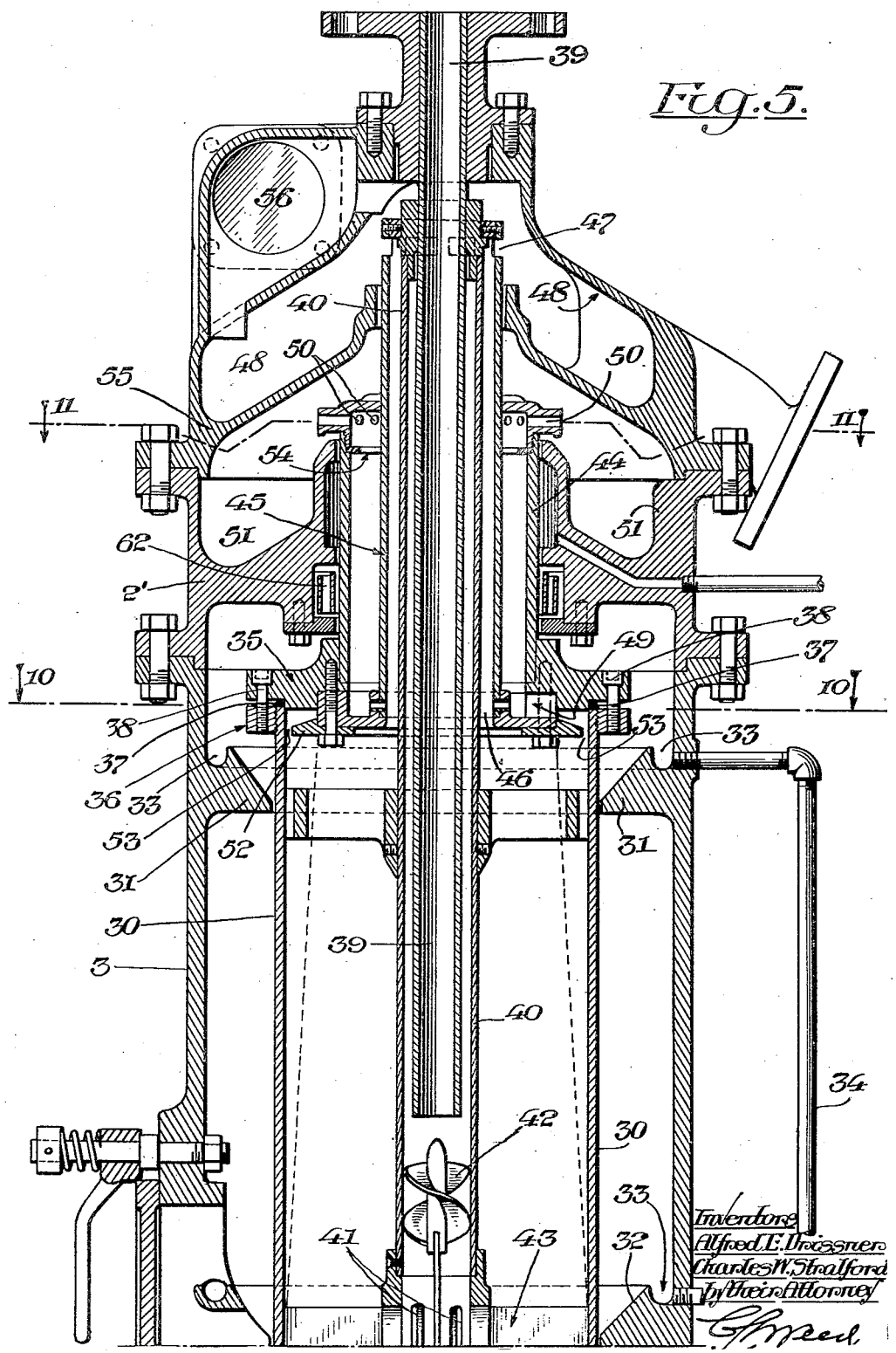

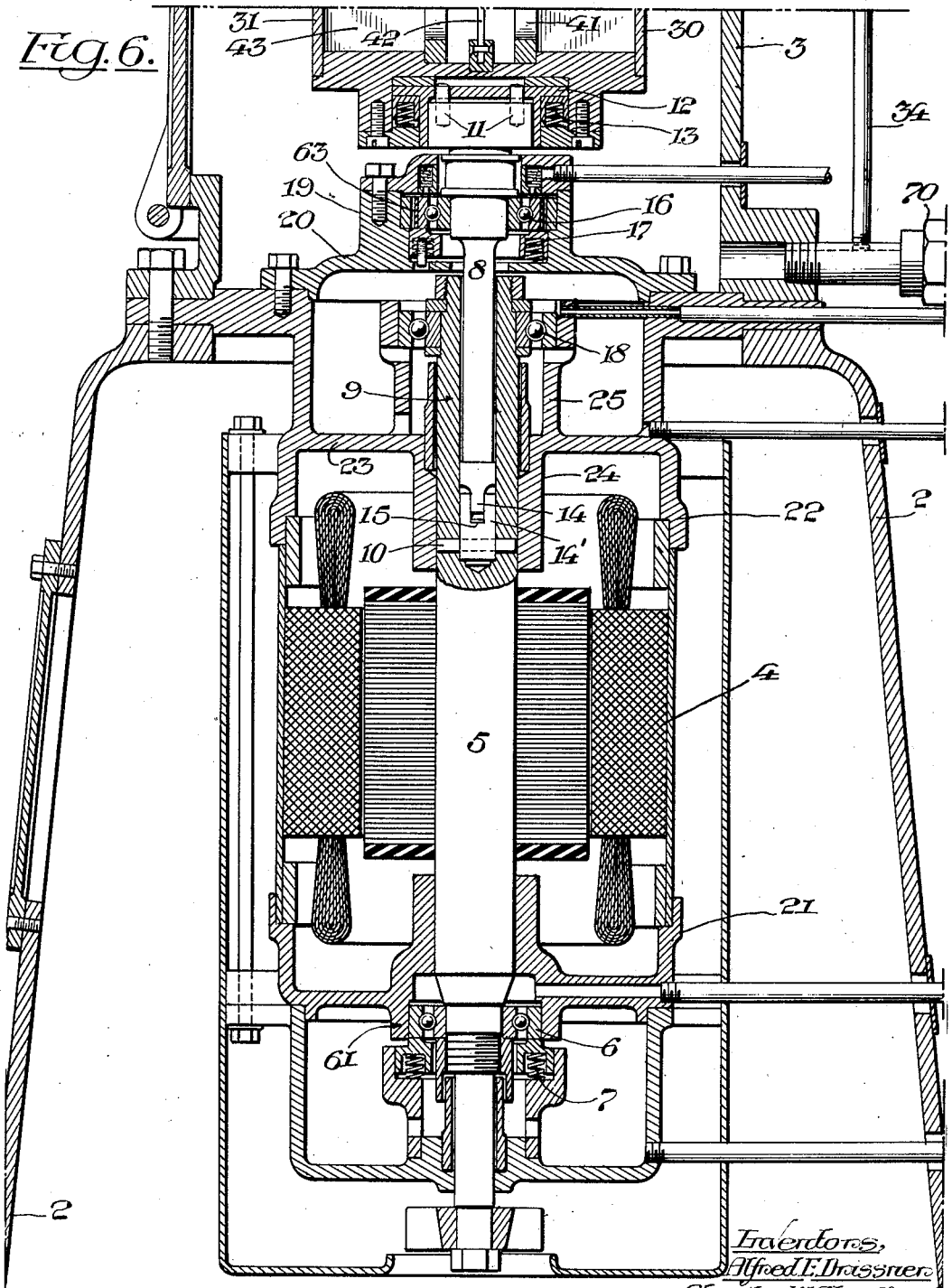

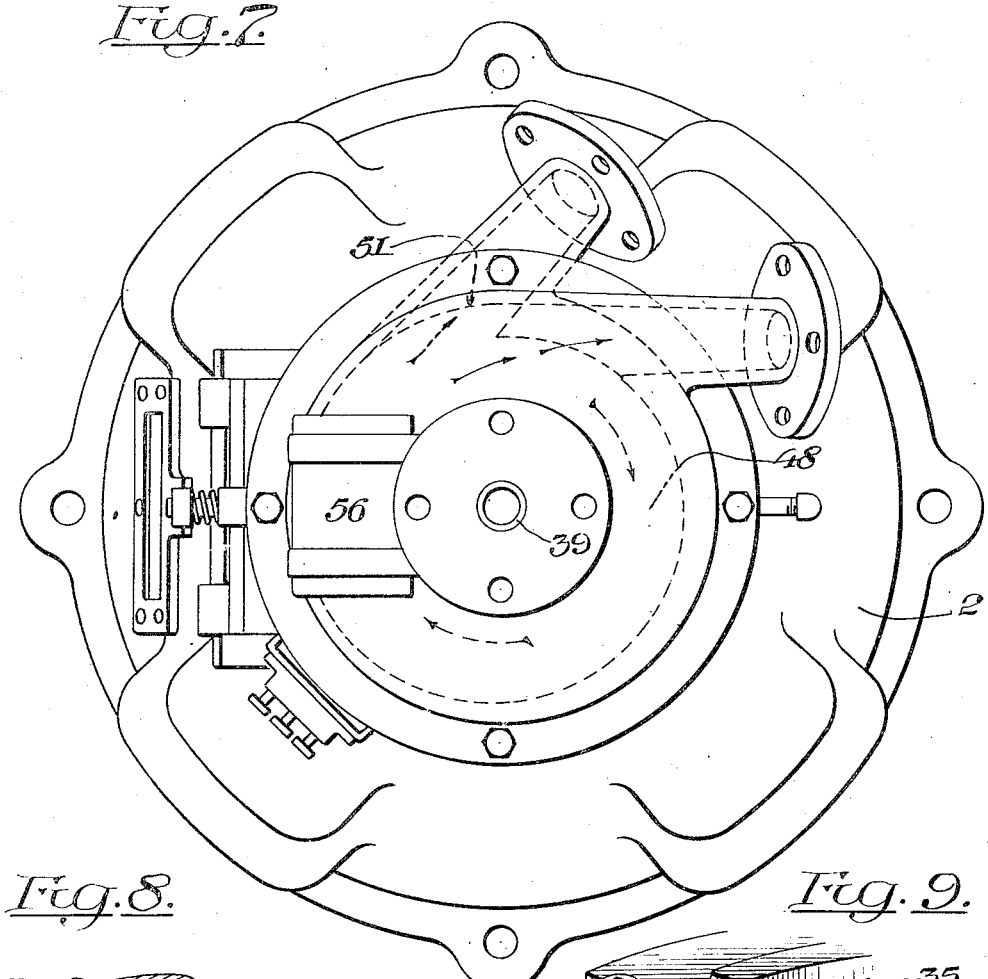
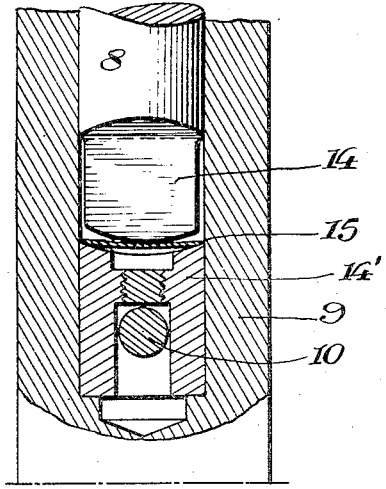
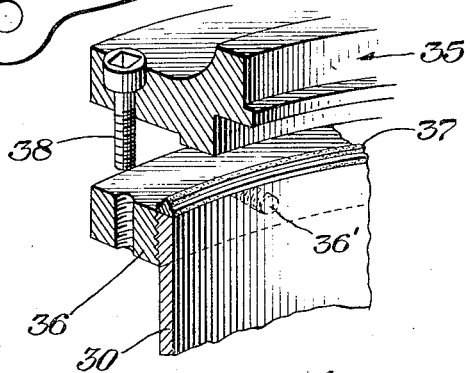

Patented Nov. 17, 1936

2,060,835

UNITED STATES PATENT OFFICE 2,060,835

CENTRIFUGE

Charles W. Stratford, Kansas City, Mo., and Alfred E. Drissner, Cleveland, Ohio, assignors to National Acme Company, Cleveland, Ohio, a corporation of Ohio Application October 26, 1932, Serial No. 639,704

22 Claims. (Cl. 233—23)

This invention relates to centrifugal separators primarily intended to separate sulphuric acid from distillate in the process of refining crude oil, the principal object of the invention being to provide a compact direct motor driven separator so constructed that it is easily accessible for cleaning, the bowl and pans of which are readily disassembled without disturbing the motor drive.

A further object of the invention is the provision of an improved centrifugal separator in which the motor is suspended below and in line with the bowl, insuring accurate alignment between the two and eliminating gears and belts thus permitting the operation of the bowl at high speed, the motor being so mounted that vibration of the bowl when starting is not transmitted to the motor and motor bearings.

A further object of the invention is the provision of an improved bowl for a centrifugal separator in which the liquid passing into the bowl is equally distributed to all parts of the bowl and at the same time is brought up to the speed of the bowl as it is discharged into the bowl.

A further object of the invention is the provision of improved discharge pans or receptacles by means of which the direction of flow of the liquid is changed, thereby avoiding the atomization of the liquid and preventing the formation of spray and vapor that would penetrate to the motor bearings and ruin them.

Numerous other objects and advantages will appear through the description and which result in the provision of a comparatively simple, inexpensive and highly efficient high speed separator capable of obtaining the desired results such as preventing the entrance of air to form an explosive mixture; the elimination of pressure which would blow the oil out of the bearings; the reduction in the air turbulence and consequent heating of the parts which would cause bearing trouble; the prevention of gasoline fumes getting into the motor; the provision of a floating drive shaft between the motor and the bowl and, generally, an improved construction by means of which the rotating parts of the apparatus may be easily and quickly brought to high speed.

In the drawings accompanying and forming a part of this specification, Fig. 1 is a side elevation of this improved centrifugal separator.

Fig. 2 is a vertical section thereof.

Fig. 3 is a cross section taken on line 3—3 of Fig. 2.

Fig. 4 is a cross section taken on line 4—4 of Fig. 2.

Fig. 5 is an enlarged vertical sectional view of the upper half including the bowl portion of the separator.

Fig. 6 is a vertical sectional view of the lower half or motor portion of the separator.

Fig. 7 is a top view of the separator part illustrating the formation of the discharge pans.

Fig. 8 is an enlarged detail sectional view illustrating the lower end of the shaft connection between the motor and the bowl.

Fig. 9 is a sectional perspective view of the fastening means between the bowl and its cover.

Fig. 10 is a cross-sectional view taken on line 10—10 of Fig. 5, and

Fig. 11 is a cross-sectional view taken on line 11—11 of Fig. 5.

Similar characters of reference indicate corresponding parts in the several views.

Before explaining in detail the present improvement and mode of operation thereof, we desire to have it understood that the invention is not limited to the details of construction and arrangement of parts which are illustrated in the accompanying drawings since the invention is capable of other embodiments, and that the phraseology we employ is for the purpose of description and not of limitation.

This improved centrifugal separator comprises a pair of housings, the housing 2 carrying the motor and the housing 3 carrying the bowl. These housings 2 and 3 are cylindrical to reduce air turbulence and thus prevent heating of the parts and are also suitably bolted together in such a way as to prevent gasoline fumes penetrating into the motor.

The motor 4 is suitably suspended within the housing 2 and the motor or main driving shaft 5 is supported at its lower end by a ball bearing 6 suitably supported by springs 7, the shaft being rotatably secured at its lower end at the bottom of the housing 2.

The bowl driving spindle 8 is driven by and projects into a sleeve 9 of the motor shaft 5 and is pinned to this shaft 5 as at 10. The upper end of this spindle 8 is provided with a pair of pins 11 projecting into a flanged bronze disk 12, held by springs 13 against the bottom of the bowl so that slippage can occur between the bowl and drive spindle without damage and the bowl is thus driven by frictional contact with this bronze disk while the springs limit the amount of thrust or driving force that can be applied to the bowl. The bottom of the bowl is provided with a flange 61 forming a chamber in which is located the flanged disk or plate 12 and an annular ring is secured to the lower end of the flange and holds the springs 13 in position between the bowl and disk flanges 61 and 61'.

The driving spindle 8 comprises a two-part member, one part having at its lower end a flat-sided tongue 14 projecting into a bifurcated member 14', which latter is pinned as hereinbefore stated at 10 to the motor shaft 5. Between the lower end of this tongue and the adjacent wall of the member 14' is a flat spring 15.

The upper end of the driving spindle 8 is supported by a ball bearing 16 which, like the bearing 6, is supported by springs 17 and below the bearing 16, the driving spindle is also supported by a ball bearing 18. Thus, the motor shaft and spindle are supported by three bearings, the top bearing 16 and the bottom bearing 6 being mounted on springs to limit the amount of weight applied to each of the ball bearings and by reason of the interlocking connection at 14 and 14', vibration of the motor to the bowl or vice versa is not imparted and a part of the downward pressure of the bowl is compensated for by the flat spring 15.

The spring suspended ball bearing 16 is carried by a housing 19 formed as a part of the cover 20 bolted to the top of the motor housing 2 and the framework of the motor housing is such that it will properly position the motor as, by means of framework flanges 21 and 22 and seal the same, the upper flange 22 forming a cover as at 23 for the motor chamber and provided with a hub 24 for the passage of the motor shaft therethrough while at the same time this cover 23 is provided with a suitable cylindrical frame 25 for supporting the ball bearing 18.

The driving connections between the motor shaft 5 and the bowl are such that there is ample allowance for relative movement between the motor shaft and bowl so that the latter will be rotated on its own axis and vibration of the bowl due to starting is not transmitted to the motor and its bearings to the damage of the latter. By placing the motor directly under the bowl, not only is a direct drive to the bowl obtained without the use of gears or belts which are so highly objectionable at high speeds, but a more compact, easily assembled and, therefore, less expensive separator is provided. Especially is this the case since the bowl can be readily disassembled without disturbing the motor drive and by means of the three sets of ball bearings the weight of the bowl and the liquid contained therein and the up and down float are taken on all three of these sets of ball bearings so that this distribution of weight adds materially to the life of the bearings by reducing pressure on any one bearing.

By the mounting of the bearing 16 upon springs, it follows that when it moves down the pressure is transmitted to the driving spindle 8 resting on the flat spring 15 which thus assists in taking up this downward pressure, a part of the pressure coming on the bearing 6 at the bottom of the motor shaft which, as hereinbefore stated, is likewise mounted on springs.

The separating bowl 30 is mounted within the housing 3, which housing has inwardly extending guide flanges 31 and 32 at the top and bottom of the bowl for guiding the bowl and at the same time are also effective as strengthening flanges to prevent fracture in the event of an explosion and are sufficiently spaced from the bowl so as not to contact therewith during the rotation of the bowl.

These flanges are provided with troughs 33 for catching any excess liquid forced out of the bowl and this liquid is carried off by drain pipes 34.

The bowl is provided with a cover 35, for which purpose the top of the bowl is provided with threads carrying a threaded ring 36 (see Fig. 9), and this ring is kept from rotating by means of pins 36'. Between the top of this bowl ring and the cover is located a gasket 37 to prevent leakage and the ring 36 has a loose threaded fit with the bowl whereby any inequalities in the thickness of the gasket are compensated for as this threaded ring can have a slight vertical movement relative to the bowl, thus insuring a tight fit between the gasket and cover at all times.

The cover is connected to the ring by hollow-head-cap screws 38 to avoid windage for if these bolts projected above the cover they would act as impellers during the rotation of the bowl and create wind pressures in the upper part of the casing 3, causing heat due to air turbulence, as a result of which the bearings would break down tending to blow the oil from the bearings and also disturb the oil seal in the bearings. In other words, they would form a separate atmosphere in the upper part of the casing from that in the lower part of the casing.

Extending downwardly into the bowl is an inlet tube 39 for feeding the emulsion to the lower end of the bowl and this tube is surrounded by a tube 40, which tube 40 at its lower end is provided with ports 41 for the passage of liquid from the tube into the bottom of the bowl. In the lower end of the tube 40 is located a propeller 42 which assists in forcing the liquid from the tube through the ports 41 into the bottom of the bowl, the lower end of this propeller being suitably connected with the bottom of the bowl for rotation thereby.

The bottom of the bowl between the ports 41 is provided with a series of pockets (see Fig. 4) formed by partitions 43 projecting upwardly from the bottom of the bowl and having their outer edges in contact with the sides of the bowl while their inner edges engage the tube 40. The object of these partitions is to insure equal distribution of the liquid to all parts of the bowl and at the same time bring the speed of the liquid up to the bowl speed before it is discharged into the bowl and these partitions project upwardly to about the height of the ports. Without these partitions, the liquid would pass through the ports into the bowl bottom and would not assume a rotative motion until the friction between the liquid and the bowl brought the liquid up to the speed of the bowl. In other words, the bowl would slide under the liquid whereas, by the use of these pockets, the partitions act as propellers and propel the liquid around and bring it up to the speed of the bowl very quickly.

Carried by the cover 35 within an annular recess thereof and projecting upwardly therefrom is a shell or housing 44 and between this shell or housing and the tube 40 is a tube 45, and the cylindrical chamber formed by the latter communicates with the top of the bowl around the tube 40 by means of an annular passage 46 while the upper part of this tube 45 has ports or passages 47 communicating with the top discharge pan 48.

The chamber formed by the shell 44 around the tube 45 likewise communicates with the top of the bowl through ports or passages 49 and at the top thereof through ports or passages 50 with the lower discharge pan 51.

Located around the tube 45 and secured to the cover is a separator disk 52 projecting adjacent to the bowl wall 30 and separated therefrom by an annular space or passage 53 for the passage of liquid from the bowl through the ports 49 to the chamber formed by the shell 44 and out through the ports 50 to the lower discharge pan 51.

Centrifugal force applied to the liquid within the bowl causes the heavier liquid to form in a layer on the inner wall of the bowl. This layer begins with a very thin layer at the bottom of the bowl and becomes thicker toward the top due to the fact that the flow of the liquid is from the bottom toward the top of the bowl and the liquid consequently becomes more and more separated into its two constituent parts as it reaches the top of the bowl and the separator disk 52 just described causes the heavy liquid to be taken from the bottom of the bowl and prevents the discharge of the liquid from the intermediate zone in the bowl which is still in an emulsified state with the result that the heavier liquid passes out through the passage 53 and ports 49 and the chamber formed between the shell 44 and the tube 45 and out through the ports 50 into the lower discharge pan 51.

The upper part of the shell 44, interiorly thereof, is provided with a detachable dam ring 54 having an opening (see Fig. 11), which may be replaceable by rings having larger or smaller openings, and by means of which the level at which the separation occurs may be varied. In other words, by substituting rings having openings of different diameters, a change in the level at which the separation of the liquid is effected and a change in the proportion of the heavy liquid which is drawn off results.

In practice, the light liquid or gasoline flows upwardly through the separator disk through the passage 46 and out through the ports 47 into the upper pan 48 while the heavier liquid, as hereinbefore explained, passes from the top of the bowl through the passage 53 and ports 49 and between the shell 44 and the tube 45 and out through the ports 50 into the discharge pan 51.

Secured to the top of the bowl housing 3 is an annular housing 2' having the lower discharge pan 51 formed therein and secured to the top of this housing 2' is a pan formed cover 55 so that the housing 2 may be considered to be made up in sections bolted together and readily assembled and disassembled.

Both of the discharge pans 48 and 51 have a volute formation (see Figs. 7 and 11) by reason of which the direction of flow of the discharging liquid is changed without atomizing it as would be the case if its discharge was interrupted close to the shell wall at right angles to the direction of that discharge and the purpose of this tangential discharge is to prevent the atomization of the discharge and the formation of vapor.

To illustrate, if a water hose is held at a slight angle close to a wall, the discharge of the water is prevented from turning into a spray but if held at right angles to the wall and directly against the wall, the water striking against the wall interrupts the stream and tends to turn it into a spray or numerous atoms so that, by tangentially discharging the liquid, the prevention of this spray and atomization is accomplished which is highly desirable since, when a spray is formed, the vapor therefrom penetrates into the bearings and as this vapor is corrosive, the bearings quickly become ruined whereas, this is avoided by the tangential discharge of the liquid in the manner described.

Should the liquid flow through the inlet tube 39 faster than it can be handled, it would so pile up that it would interfere with the proper working of the separator and in this event, it passes by the detector window 56, thus indicating to the operator that the rate of flow should be curtailed.

In the present improvement, by having the motor frame or housing separate from the bowl housing, the motor is explosion proof and when the apparatus is used in connection with gasoline or distillate, the fumes therefrom cannot get into the motor. The oil inlet and drain of the motor housing is separate from that of the bowl housing, the bowl housing being suitably sealed to avoid the entrance of air to form an explosive mixture.

The bowl housing is provided with a suitable door so spring held that it will be readily released and prevent the rupture of the parts in the event of an explosion.

In the operation of the machine, the gasoline or distillate to be separated passes through the inlet tube 39, strikes the propeller 42, this fluid thus falling in a column, not rotating, and the propeller rotating with the bowl pulls the liquid quickly into the bowl, whereupon the partitions 43 impart rotation to the liquid and insure an even distribution of the liquid in the bowl and also prevent the liquid escaping into the bowl before it is brought up to the speed of the bowl.

During the operation of the machine, the bowl passes through several zones of vibration in bringing it up to its proper speed of rotation, which is about 10,000 R. P. M., the speed at the outside of the bowl being about four miles per minute and there must be some allowance for this vibration. Consequently, the play between the driving spindle of the bowl and the motor shaft, and the manner of supporting the several parts are highly important to permit this vibration without breakage of the parts.

From the foregoing, it will be observed that the bowl is practically a floating bowl due to the friction drive between the spindle 8 and the bowl and that the connection between the motor shaft and the driving spindle 8 is such that a free floating action is obtained between these parts.

In practice, the air seal 70 is provided to take care of the overflow or leakage of the bowl and prevent the accumulation of liquid.

In addition to the spring supported ball bearings surrounding the motor shaft and bowl driving spindle, the bowl is cushioned at the bottom by the springs hereinbefore referred to and between its ends a suitable cushioning spring 62 is located around the shell 44 and the ball bearing for the driving spindle 8 is held sidewise by means of flat springs 63 located in the ring around the ball bearing, thereby allowing the ball bearing to float sidewise.

It is to be understood that, by describing in detail herein any particular form structure or arrangement, it is not intended to limit the invention beyond the terms of the several claims or the requirements of the prior art.

Having thus explained the nature of our said invention and described a way of constructing and using the same, although without attempting to set forth all of the forms in which it may be made or all of the modes of its use, we claim:

1. In a centrifugal separator, the combination of a motor, a shaft extending upwardly therefrom, a spindle flexibly connected with the upper end of said shaft, a rotating bowl supported by said spindle and in axial alignment with the motor shaft, spring supported ball bearings for supporting the upper end of the spindle, spring supported ball bearings for supporting the lower end of the motor shaft, and cushioning springs for the bowl, the spindle and motor shaft having therebetween a supporting spring.

2. In a centrifugal separator, the combination of a motor, a shaft extending therethrough and supported at its lower end by spring supported ball bearings, a rotating bowl located in axial alignment with the motor shaft, a spindle flexibly connected with the motor shaft and frictionally connected with the bottom of the bowl for driving the bowl, a spring supported ball bearing for the spindle, cushioning springs for the bowl, spring means for limiting the side play of the bowl, and a spring between the spindle and motor shaft to assist in taking the weight of the bowl, the bowl and its spindle having a floating position relative to the motor.

3. In a centrifugal separator, the combination of a motor, a motor shaft projecting upwardly therefrom, a bowl spindle rotated by said shaft and provided with a pair of pins, a plate having openings for said pins, a bowl in frictional engagement with said plate, and resilient means for holding said plate in engagement with the bowl.

4. In a centrifugal separator, the combination of a motor, a motor shaft projecting upwardly therefrom, a bowl spindle rotated by said shaft and provided with a pair of pins, a plate having openings for said pins, a bowl in frictional engagement with said plate, resilient means for holding said plate in engagement with the bowl, and means carried by the bowl for holding said resilient means in position.

5. In a centrifugal separator, the combination of a motor, a motor shaft projecting upwardly therefrom, a bowl spindle rotated by said shaft and provided with a pair of pins, a plate having openings for said pins, a bowl in frictional engagement with said plate, and resilient means for holding said plate in engagement with the bowl, said bowl having a depending flange at the bottom forming a chamber for the reception of the plate.

6. In a centrifugal separator, the combination of a motor, a motor shaft projecting upwardly therefrom, a bowl spindle rotated by said shaft and provided with a pair of pins, a plate having openings for said pins, a bowl in frictional engagement with said plate, and resilient means for holding said plate in engagement with the bowl, said bowl having a flange at the bottom forming a chamber for the reception of the plate and said plate having a depending flange spaced from the bowl flange and forming a chamber for the reception of said resilient means.

7. In a centrifugal separator, the combination of a rotating bowl having a depending flange, a disk therein for frictionally engaging the lower end of the bowl and having a flange spaced from the bowl flange, cushioning means located between the flanges, a spindle engaging said disk for rotating the bowl, and means for rotating the spindle.

8. In a centrifugal separator, the combination of a rotating bowl having a depending flange, a disk therein for frictionally engaging the lower end of the bowl and having a flange spaced from the bowl flange, cushioning means located between the flanges, a spindle engaging said disk for rotating the bowl, and means for rotating the spindle and comprising a motor and a motor shaft in alignment with the spindle shaft.

9. In a centrifugal separator, the combination of a rotating bowl having a depending flange, a disk therein for frictionally engaging the lower end of the bowl and having a flange spaced from the bowl flange, cushioning means located between the flanges, a spindle engaging said disk for rotating the bowl, and means for rotating the spindle and comprising a motor and a motor shaft in alignment with the spindle shaft, said shaft and spindle having a flexible connection.

10. In a centrifugal separator, the combination of a rotating bowl having a depending flange, a disk therein for frictionally engaging the lower end of the bowl and having a flange spaced from the bowl flange, cushioning means located between the flanges, a spindle engaging said disk for rotating the bowl, means for rotating the spindle and comprising a motor and a motor shaft in alignment with the spindle shaft, said shaft and spindle having a flexible connection, and cushioning means between said shaft and spindle.

11. A centrifugal separator comprising a motor, a shaft, a spindle, a bowl radially located resilient means for cushioning the side play of the bowl and its spindle, resilient means for cushioning the bowl, resilient means for cushioning the spindle, and resiliently supported anti-friction bearings for the shaft and spindle.

12. In a centrifugal separator, the combination of a motor having an upwardly projecting shaft, a rotating bowl located above the motor and in line therewith and having a spindle connected with the motor shaft, resilient anti-friction bearings for supporting the motor shaft, resilient anti-friction bearings for supporting the bowl spindle, cushioning resilient means at the side of the bowl, cushioning resilient means at the side of the bowl spindle, and resilient cushioning means between the spindle and shaft.

13. A centrifugal separator comprising a motor having an upwardly projecting motor shaft, spring supported anti-friction bearings for supporting the lower end of the motor shaft, anti-friction bearings for supporting the upper end of said shaft, a bowl spindle, spring supported anti-friction bearings for supporting the spindle, a bowl connected with the spindle, cushioning means for the bowl, and spring means for limiting the side play of the bowl.

14. In a centrifugal separator, the combination of a motor and its shaft, a rotating bowl above the motor and its shaft and in axial alignment therewith, and a positively driven floating spindle shaft between the motor shaft and bowl bottom and in axial alignment and flexibly and positively connected with the motor shaft and having a rigid formation from end to end and from its point of positive connection with the motor shaft to its point of connection with the bowl and frictionally connected with the bottom of the bowl with its upper end below the plane of gravity of the bowl.

15. In a centrifugal separator, the combination of a motor and its shaft, a rotating bowl above the motor and its shaft and in axial alignment therewith, a positively driven floating spindle shaft between the motor shaft and bowl bottom and in axial alignment and flexibly and positively connected with the motor shaft and having a rigid formation from end to end and from its point of positive connection with the motor shaft to its point of connection with the bowl and frictionally connected with the bottom of the bowl with its upper end below the plane of gravity of the bowl, and resilient means at the upper end of the floating spindle shaft for limiting the thrust or driving force applied to the bowl.

16. In a centrifugal separator, the combination of a motor and its shaft, a rotating bowl above the motor and its shaft and in axial alignment therewith, a positively driven floating spindle shaft between the motor shaft and bowl bottom and in axial alignment and flexibly and positively connected with the motor shaft and having a rigid formation from end to end and from its point of positive connection with the motor shaft to its point of connection with the bowl and frictionally connected with the bottom of the bowl with its upper end below the plane of gravity of the bowl, resilient means at the upper end of the floating spindle shaft for limiting the thrust or driving force applied to the bowl, and resilient means at the lower end of the floating spindle shaft for cushioning said shaft relative to the motor shaft.

17. In a centrifugal separator, the combination of a motor and its shaft, a rotating bowl above the motor and its shaft and in axial alignment therewith, a positively driven floating spindle shaft between the motor shaft and bowl bottom and in axial alignment and flexibly and positively connected with the motor shaft and having a rigid formation from end to end and from its point of positive connection with the motor shaft to its point of connection with the bowl and frictionally connected with the bottom of the bowl by a relatively large horizontal plate surface, with its upper end below the plane of gravity of the bowl.

18. In a centrifugal separator, the combination of a motor and its shaft, a rotating bowl above the motor and its shaft and in axial alignment therewith, a positively driven floating spindle shaft between the motor shaft and bowl bottom and in axial alignment and flexibly and positively connected with the motor shaft and having a rigid formation from end to end and from its point of positive connection with the motor shaft to its point of connection with the bowl and frictionally connected with the bottom of the bowl with its upper end below the plane of gravity of the bowl, and cushioning means between the motor shaft and the lower end of the positively driven rigid floating spindle shaft.

19. In a centrifugal separator, the combination of a motor and its shaft, a housing carrying the motor, a rotating bowl above the motor and its shaft and in axial alignment therewith, a housing for the bowl, a positively-driven floating spindle shaft between the motor shaft and bowl bottom and in axial alignment and flexibly and positively connected with the motor shaft and having a rigid formation from end to end and from its point of positive connection with the motor shaft to its point of connection with the bowl and frictionally connected with the bottom of the bowl with its upper end below the plane of gravity of the bowl, and a supporting housing for said floating spindle shaft and located within the bowl housing, and resilient means for cushioning the bowl and its postively driven rigid floating spindle shaft.

20. In a centrifugal separator, the combination of a motor and its shaft, a housing carrying the motor, a rotating bowl above the motor and its shaft and in axial alignment therewith, a housing for the bowl, a positively driven floating spindle shaft between the motor shaft and bowl bottom and in axial alignment and flexibly and positively connected with the motor shaft and having a rigid formation from end to end and from its point of positive connection with the motor shaft to its point of connection with the bowl and frictionally connected with the bottom of the bowl with its upper end below the plane of gravity of the bowl, a supporting housing for said floating spindle shaft and located within the bowl housing, resilient means for cushioning the bowl in transverse directions, and resilient means for cushioning the positively driven rigid floating spindle shaft.

21. In a centrifugal separator, the combination of a motor and its shaft, a housing carrying the motor, a rotating bowl above the motor and its shaft and in axial alignment therewith, a housing for the bowl, a positively driven floating spindle shaft between the motor shaft and bowl bottom and in axial alignment and flexibly and positively connected with the motor shaft and having a rigid formation from end to end and from its point of positive connection with the motor shaft to its point of connection with the bowl and frictionally connected with the bottom of the bowl with its upper end below the plane of gravity of the bowl, a supporting housing for said floating spindle shaft and located within the bowl housing, resilient means for cushioning the bowl in transverse directions, resilient means for cushioning the positively driven rigid floating spindle shaft, and resiliently supported anti-friction bearings for the floating spindle shaft and the motor shaft.

22. In a centrifugal separator, the combination of a motor and its shaft, a housing carrying the motor, a rotating bowl above the motor and its shaft and in axial alignment therewith, a housing for the bowl, a positively driven floating spindle shaft between the motor shaft and bowl bottom and in axial alignment and flexibly and positively connected with the motor shaft and having a rigid formation from end to end and from its point of positive connection with the motor shaft to its point of connection with the bowl and frictionally connected with the bottom of the bowl by a relatively large horizontal plate surface with its upper end below the plane of gravity of the bowl, a housing for the floating shaft and located within the bowl housing, resilient means for cushioning side play of the bowl, resilient means for cushioning the rigid floating spindle shaft, resilient means at the upper end of the floating spindle shaft for limiting the thrust applied to the bowl, resilient means at the lower end of the floating spindle shaft for cushioning said shaft relative to the motor shaft, resiliently supported anti-friction bearings for the rigid floating spindle shaft, and resiliently supported anti-friction bearings for the motor shaft.

CHARLES W. STRATFORD.
ALFRED E. DRISSNER.